Nov. 20, 1923.

P. E. DUDLEY ET AL 1,474,768

COATING REFRIGERATOR AND CANDY SUPPORT THEREFOR

Filed July 12, 1921

P. E. Dudley and } Inventors
H. Boice,

By their attorney J. R. Squair.

Patented Nov. 20, 1923.

1,474,768

UNITED STATES PATENT OFFICE.

PHILIP E. DUDLEY, OF WILMINGTON, DELAWARE, AND HARRY BOICE, OF NEWBURGH, NEW YORK, ASSIGNORS TO E. I. DU PONT DE NEMOURS & COMPANY, OF WILMINGTON, DELAWARE, A CORPORATION OF DELAWARE.

COATING REFRIGERATOR AND CANDY SUPPORT THEREFOR.

Application filed July 12, 1921. Serial No. 484,099.

*To all whom it may concern:*

Be it known that we, PHILIP E. DUDLEY and HARRY BOICE, citizens of the United States, respectively, and residents of Wilmington, county of New Castle, and State of Delaware, and Newburgh, county of Orange, and State of New York, respectively, have invented a certain new and useful Coating Refrigerator and Candy Support Therefor, of which the following is a specification.

This invention is, generally speaking, in the art of candy manufacture, more particularly in the coating branch thereof. It relates to a coating refrigerator for use in the candy making apparatus and, in detail, to the biscuit support or conveyor of such refrigerator, which conveyor carries the candy, already coated and to be chilled in the refrigerator to fix the coating on the biscuit.

In the making of coated candies the individual candy biscuits are, of course, first made and then they are coated, for example with chocolate. In applying the coating, warm melted chocolate is sprayed onto the biscuit, both bottom and top, in any desired manner, the top coating being carried on, for example, in an "enrober", and the bottom spraying being done previously. The coated biscuits are delivered from the enrober fully coated, but with the coating still soft so that it must be cooled to fix it on the biscuit.

The trade requires that the bottom coating of the candies be smooth and shiny and it is one of the problems of the candy maker to produce candies whose appearance shall meet these requirements. In practice the desired bottom must be produced during the cooling of the coating.

We have provided a coating refrigerator which in cooling the candies gives them the desired finish, and have also provided a candy support for carrying the candies through the refrigerating or cooling space and having a surface such that they will have the desired bottoms when cold. Furthermore, the present support is long-wearing, relatively inexpensive both with respect to original cost and time-loss for replacements and repairs, and is readily and easily cleaned without danger of disrupting, or injuring the surface of, the same.

It is an object of the invention to provide a coating refrigerator, and a candy support therefor, having the characteristics above noted. To this end, and also to improve generally upon machines and articles of the character indicated, our invention consists in the various matters hereinafter described and claimed.

Without restricting our invention thereto we describe it by reference to the structure embodying it illustrated in the accompanying drawings. In these drawings:—

To aid in the understanding of our invention we shall first describe the illustrated assembly in a general way; and then we shall more fully discuss certain features thereof, thus explaining our invention in detail:—

Figure 1:
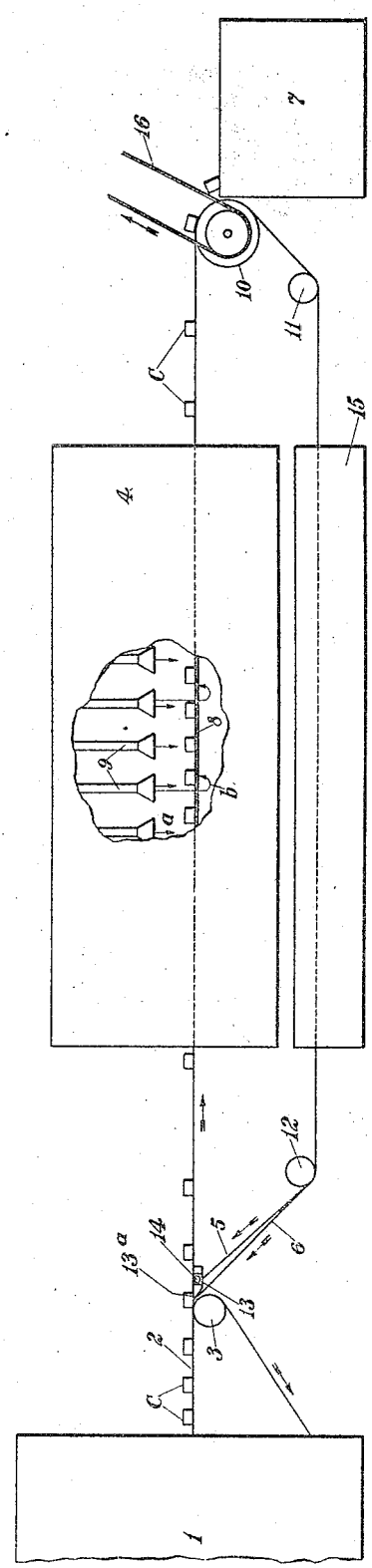
Figure 1 is a conventional, simplified, and somewhat diagrammatic side elevational view of a portion of a candy-coating assembly embodying our invention.
Figure 2:
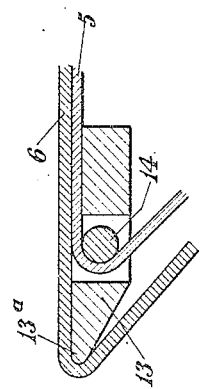
Figure 2 is a somewhat conventional sectional view taken cross-wise of the rounding or guide bar and longitudinally of the belts, the relative proportions being not strictly adhered to, the better to illustrate the structure.

Referring now to the illustrated structure, and more particularly to Figure 1, the assembly comprises: an enrober 1 with its wire screen conveyor 2, for the candies C, carried over the roller 3; the refrigerator 4 with its major conveyor belt 5 and its candy-supporting conveyor 6, constructed in accordance with the present invention and travelling with the belt 5 (in Figure 1 to avoid complication no attempt is made to separately indicate both conveyors along the lengths where they are in contact); and the receiver 7 for imperfect candies and surplus chocolate. The various conveyors move in the direction of the arrows to carry the candies from left to right, as the parts are shown in Figure 1. The refrigerator 4 comprises a substantially closed casing, except of course for an entrance and an exit for the belts, in which is a perforated supporting plate 8 for the belts and a number of air supply ducts 9 from which cold air is directed upon the candies from above and is passed around each side of the belts and plate, (these being of course somewhat narrower than the casing) and up through the plate to cool the bottoms of the candies, as respectively indicated by the arrows *a* and *b*. The details of the internal arrangements of the refrigerator are not primarily related to the present invention and, therefore, no attempt to illustrate them is made. The belts 5 and 6 travel together around rollers such as 10, 11 and 12; but at the cross bar 13 the two belts separate, the main belt 5 departing from the biscuit support 6 at the roller 12 and rejoining the support at the roller 14 carried in the bar 13 (Figure 2) and the biscuit support bending around the nose 13ª of the bar. The purpose of this is to enable the support 6 to be brought very close to (but spaced from) the belt 2 to readily receive even small candies therefrom. In returning to the bar 13 from the roller 10 the belts are passed through a guide trough 15 where surplus chocolate yet on the biscuit support is deposited. The conveyors 5 and 6 are driven in any suitable way, for example by the driving belt 16 actuating the roller 10. The operation of the structure is briefly as follows:—The candies emerge from the enrober 1 fully coated with warm soft chocolate, are delivered to the support 6 and while resting on the surface thereof are cooled by being passed through the refrigerator 4, and, on issuing from the latter the perfect candies are removed, by the machine tender, from the support along the length thereof between the refrigerator proper and the roller 10, the imperfect candies discharging from the support 6 into the receptacle 7 as the turn about the roller 10 is made.

As noted above, it is while the candies are being cooled that the smooth and shiny bottoms are to be produced, that is, it is while the candies are being carried by the belt 5, and, according to the present invention, while they are resting immediately on the candy support 6, of the character now to be described in detail. Not only should this support have a surface that will give the smooth and shiny bottom called for, but furthermore, it must be able to make the abrupt turn about the nose 13ª of the bar 13, be long-wearing, be readily cleaned and be relatively inexpensive.

Figure 3:
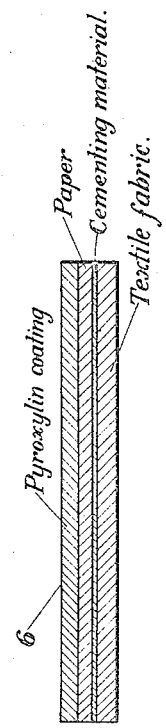
Figure 3 is a conventional exaggerated cross-sectional view of the coated-biscuit support, or candy conveyor belt, with the various strata legended.

According to the present invention the refrigerator has a candy support 6 of composite character, the same comprising three body layers, each presenting certain desired characteristics to give a support having the above mentioned, and other important and highly desirable, features. That is to say, the body comprises, see Fig. 3, a base layer or support of thin, open-weave, and relatively coarse, textile fabric, a layer of of smooth-surface paper, and a relatively thin layer or surface coating of pyroxylin, the fabric and paper being firmly united by a cementing agent and the pyroxylin being firmly anchored to the paper. To give flexibility a suitable softener is desirably used in the coating.

With a support or conveyor of this character, the textile fabric contributes materially to that tensile strength which is made necessary by the fact that the support is, in practical effect, a driven travelling belt; and, too, the fabric of course furnishes a suitable support for the remaining layers. The paper gives an ideally smooth surface to carry the pyroxylin and so, assists in giving that the highly essential smoothness of surface. The pyroxylin gives a smooth surface from which the candies come with the desired smooth and shiny bottoms, which surface is readily cleaned, and will not absorb cocoa butter (which would be absorbed by, and quickly destroy, paper coated with, say, casein). And the support has the flexibility necessary to enable it to pass properly around the relatively sharp bend at the nose 13ª of the bar 13, without injury; is relatively thin which results, so far as the support 6 is concerned, in but a layer of minimum thickness lying between the bottoms of the candies and the cooling air directed upward in the refrigerator (arrow *b* Fig. 1); and is strong against disruption, tearing etc.

Again as to the paper, this permits the use of coarse open-weave, and therefor inexpensive, fabric, and, at the same time permits of a relatively thin, and therefor flexible and inexpensive layer of pyroxylin, while giving a proper surface. Were one to coat the pyroxylin directly on to fabric then, even were it possible with the use of a heavy coating to get the requisite surface, the expense and lack of flexibility would be prohibitive. As a matter of fact, even with a heavy coating on fabric, the surface, though apparently, and to the eye, of the requisite smoothness is, in reality, not sufficiently smooth; the bottoms of candies when held to the light show the markings of the fabric.

It will be seen that we have provided a refrigerator which in cooling the coating provides the required smooth and shiny bottom surface, which will run for a long periods without the necessity of repairing its conveyor belt, and whose conveyor belt is readily cleaned and proof against the harmful effects of cocoa butter.

A conveyor belt of the present character may be made in various ways, and, by way of example merely, may be made as follows:—For the textile fabric may be used cotton sheeting grey goods, 5.13 running yards of 45 inch goods to the pound, i. e. weighing 2.5 oz. per square yard. The paper may be wrapping paper, 4 running yards of 45 inch goods to the pound, i. e. weighing 3.2 oz. per square yard. The cementing agent for uniting the fabric and paper may be rubber cement consisting, for example, of 20 parts of crude rubber dissolved in 80 parts of 90% benzol by weight, and four ounces of this per running yard of the 45 inch goods, may be used. The pyroxylin solutions for the coating may be (1) a sizing solution comprising a clear $10\frac{2}{3}$ ounce jelly ($10\frac{2}{3}$ oz. pyroxylin to the gallon of solvent) containing 1 to 2 parts by weight, preferably $1\frac{1}{2}$ parts, of castor oil (softener) to 1 of pyroxylin and (2) a clear 16 ounce jelly (16 oz. pyroxylin to the gallon of solvent) containing 1 to 2, preferably $1\frac{1}{2}$ parts of castor oil to 1 of pyroxylin. The pyroxylin solvent may be any suitable one, for example, 40 parts of ethyl acetate by weight to 60 parts of benzol. The total deposit of pyroxylin may be from three to seven tenths ounce per square yard, desirably one-half ounce; the total deposits of solids (oil and pyroxylin), when using the one and one-half parts of oil indicated above, being about seven-tenths ounce to one and three-quarters, desirably one and one-quarter ounces per square yard.

In making the support or conveyor material, rubber cement is applied to either the paper or the fabric, preferably the former, and dried until "tacky," in any desired manner for example in a machine such as is used for pyroxylin coating (if the cement is applied to the paper, a "blanket" machine is desirable;) and then the paper and fabric are combined between pressure rolls. The paper face of the web of combined paper-and-fabric body is now coated with the pyroxylin solutions, using, for example a regular "knife" pyroxylin coating machine and drying after each coat. First a coat of solution "1" is applied, which sizes the paper, and then a sufficient number of coats (e. g., three) of solution "2" to bring the deposit up to the desired amount. (In passing the body through the pyroxylin coating machine it is desirable to run the body with the paper side faced away from any axis of material bending in order not to unduly distort the paper.)

When completed the material is cut to such width as desired, for illustration 14 inches, and a length of the same suitable for the particular refrigerator in question is used in the form of an endless belt carried, as aforesaid, on the canvas conveyor belt, as 5, and frictionally moved along therewith, with the pyroxylin coated surface forming, in practical effect, a candy-contacting surface for the canvas belt covering the same substantially from side to side. Or, if desired for any reason, a support of the present invention may be used without the conveyor belt as 5, and be directly carried and driven by the rollers, as 10, 11, and 12, but as in the illustrated example, be passed over the nose $13^a$. The joining of the ends of the conveyor, to make it endless, or after inserting a repair length, may be done in any suitable manner, for example with adhesive tape applied to the fabric side of the conveyor and connecting the abutting ends.

We claim:—

1. In a candy coating refrigerator having a refrigerating space and means for causing the travel of a candy support in said space; a candy support having a pyroxylin surface.

2. In a candy coating refrigerator having a refrigerating space and means for driving a belt-like conveyor in said space; a candy conveyor in the character of a belt having a pyroxylin candy supporting surface.

3. In a candy coating refrigerator having a refrigerating space, a major conveying belt mounted for travel in said space, and means for driving said belt; a pyroxylin-surface candy support carried with said belt and providing a candy-contacting surface for said belt.

4. In a candy coating refrigerator having a refrigerating space and means for causing the travel of a candy support in said space; a candy support comprising textile fabric carrying a pyroxylin candy-contacting coating.

5. In a candy coating refrigerator having a refrigerating space and means for causing the travel of a candy support in said space; a candy support comprising textile fabric having a paper layer attached thereto and a pyroxylin candy-contacting layer attached to said paper.

6. A candy support comprising a web of textile fabric, a smooth weave-covering sheet of felted fibre attached to said web, and a pyroxylin candy-contacting coating attached to said sheet.

7. A candy support comprising a web of textile fabric, a sheet of paper attached to said web, and a pyroxylin candy-contacting coating attached to said paper.

8. A candy support comprising a web of textile fabric, a sheet of paper attached to said web, and a pyroxylin candy-contacting coating, comprising from three to seven-tenths ounces of pyroxylin per square yard of paper surface, attached to said paper.

9. A candy support comprising a web of textile fabric, a sheet of paper attached to said web, and a pyroxylin candy-contacting coating comprising pyroxylin together with a softener attached to said paper.

10. A candy support comprising a web of textile fabric, a sheet of paper attached to said web, and a pyroxylin candy-contacting coating comprising from three to seven-tenths ounce of pyroxylin, together with from one to two parts of castor oil per part of pyroxylin, per square yard of paper surface, attached to said paper.

In testimony whereof we affix our signatures.

PHILIP E. DUDLEY.
HARRY BOICE.